United States Patent
Forutanpour et al.

(10) Patent No.: US 9,582,737 B2
(45) Date of Patent: Feb. 28, 2017

(54) CONTEXT-SENSITIVE GESTURE CLASSIFICATION

(71) Applicant: QUALCOMM Incorporated, San Diego, CA (US)

(72) Inventors: Babak Forutanpour, Carlsbad, CA (US); Shivakumar Balasubramanyam, San Diego, CA (US); Vitor R. Carvalho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 14/026,043

(22) Filed: Sep. 13, 2013

(65) Prior Publication Data

US 2015/0078613 A1    Mar. 19, 2015

(51) Int. Cl.
| | |
|---|---|
| *G06K 9/00* | (2006.01) |
| *G06K 9/62* | (2006.01) |
| *G06F 3/01* | (2006.01) |
| *G06K 9/66* | (2006.01) |
| *G06F 3/0488* | (2013.01) |

(52) U.S. Cl.
CPC ........... *G06K 9/6267* (2013.01); *G06F 3/017* (2013.01); *G06F 3/04883* (2013.01); *G06K 9/00355* (2013.01); *G06K 9/66* (2013.01)

(58) Field of Classification Search
None
See application file for complete search history.

(56) References Cited

U.S. PATENT DOCUMENTS

| | | | |
|---|---|---|---|
| 5,454,043 A * | 9/1995 | Freeman | A61B 5/1121 345/419 |
| 6,249,606 B1 | 6/2001 | Kiraly et al. | |
| 8,147,248 B2 | 4/2012 | Rimas-Ribikauskas et al. | |
| 8,436,821 B1 | 5/2013 | Plichta et al. | |
| 2009/0189858 A1* | 7/2009 | Lev | G06F 3/017 345/158 |
| 2010/0194679 A1* | 8/2010 | Wu | G06K 9/00375 345/156 |
| 2011/0173204 A1 | 7/2011 | Murillo et al. | |
| 2011/0173574 A1 | 7/2011 | Clavin et al. | |

(Continued)

FOREIGN PATENT DOCUMENTS

| | | |
|---|---|---|
| EP | 2354930 A1 | 8/2011 |
| EP | 2472393 A1 | 7/2012 |

OTHER PUBLICATIONS

International Search Report and Written Opinion—PCT/US2014/055344—ISA/EPO—Dec. 4, 2014.

(Continued)

*Primary Examiner* — Tsung-Yin Tsai
(74) *Attorney, Agent, or Firm* — Kilpatrick Townsend & Stockton

(57) ABSTRACT

Various arrangements for recognizing a gesture are presented. User input may be received that causes a gesture classification context to be applied from a plurality of gesture classification contexts. This gesture classification context may be applied, such as to a gesture analysis engine. After applying the gesture classification context, data indicative of a gesture performed by a user may be received. The gesture may be identified in accordance with the applied gesture classification context.

24 Claims, 8 Drawing Sheets

(56) References Cited

U.S. PATENT DOCUMENTS

| | | | |
|---|---|---|---|
| 2011/0234840 A1* | 9/2011 | Klefenz | G06K 9/00375 |
| | | | 348/222.1 |
| 2011/0304573 A1 | 12/2011 | Smith | |
| 2012/0016641 A1 | 1/2012 | Raffa et al. | |
| 2012/0089952 A1 | 4/2012 | Song et al. | |
| 2012/0214594 A1* | 8/2012 | Kirovski | A63F 13/213 |
| | | | 463/36 |
| 2012/0223880 A1* | 9/2012 | Birnbaum | G06F 3/015 |
| | | | 345/156 |
| 2012/0313847 A1* | 12/2012 | Boda | H04M 1/72569 |
| | | | 345/156 |
| 2013/0069867 A1* | 3/2013 | Watanabe | G06F 3/017 |
| | | | 345/156 |
| 2013/0170699 A1* | 7/2013 | Bran | G06K 9/00355 |
| | | | 382/103 |
| 2013/0285899 A1* | 10/2013 | Huang | G06F 3/005 |
| | | | 345/156 |
| 2014/0010441 A1* | 1/2014 | Shamaie | G06K 9/00355 |
| | | | 382/164 |
| 2014/0119596 A1* | 5/2014 | Chang | G06K 9/00375 |
| | | | 382/103 |
| 2014/0267113 A1* | 9/2014 | Lisseman | G06F 3/0414 |
| | | | 345/173 |

OTHER PUBLICATIONS

Rubine D H., "The Automatic Recognition of Gestures", Dec. 1, 1991 (Dec. 1, 1991). XP055109432, Retrieved from the Internet: URL:http://citeseer.ist.psu.edu/viewdocjdownload?doi=10.1.1.116. 1350&rep=rep1&type=pdf [retrieved on Mar. 24, 2014].

* cited by examiner

CONTEXT-SENSITIVE GESTURE CLASSIFICATION

BACKGROUND

Gestures provide an intuitive way for a user to provide input to a computerized device. Typically, a gesture involves a hand or other body part being moved in an easily repeatable movement. For example, gestures which may serve as input to a computerized device include snaps, grasps, pinches, and swipes. The more accurately the computerized device identifies a person's performed gesture, the more efficient and enjoyable the user's experience with the computerized device may be. For example, if a user performs a snap gesture, but the computerized device mistakenly identifies that some other gesture has been performed, the computerized device may perform a function undesired by the user or may not respond to the user's gesture.

Further, when performing a gesture, different users' performance of the gesture may vary to an extent. For example, a first person may perform a much stronger and more distinct snap gesture than a second person. For these reasons, it may be beneficial to accurately identify a gesture performed by a user.

SUMMARY

Various arrangements for recognizing gestures are described. In some embodiments, a method for recognizing a gesture is presented. The method may include receiving, by a computer system, user input that causes a gesture classification context to be applied from a plurality of gesture classification contexts available for a gesture analysis engine. The method may include applying, by the computer system, the gesture classification context to the gesture analysis engine. The method may include, after applying the gesture classification context, receiving, by the computer system, data indicative of the gesture performed by a user. The method may include identifying, by the computer system, using the gesture analysis engine, the gesture in accordance with the applied gesture classification context.

Embodiments of such a method may include one or more of the following features: The method may include, prior to receiving the user input, calculating, by the computer system, a first set of metrics to differentiate among only a first subset of gestures selected from a set of available gestures. Only the first subset of gestures may be eligible to be identified when the gesture classification context is active. The method may include receiving an indication of a second subset of gestures from the set of available gestures. Each gesture of the second subset of gestures may be valid in a second gesture classification context. The method may include calculating, by the computer system, a second set of metrics for the second subset of gestures to differentiate among only the second subset of gestures. Only the second subset of gestures may be eligible to be identified when the second gesture classification context is active. The second subset of gestures and the first subset of gestures may contain at least one different gesture. The method may include, after calculating the second set of metrics, receiving, by the computer system, user input that causes the second gesture classification context to be applied to the gesture analysis engine. The method may include, after applying the second gesture classification context, receiving, by the computer system, data indicative of a second gesture performed by the user.

Additionally or alternatively, embodiments of such a method may include one or more of the following features: The method may include interpreting, by the computer system, the second gesture in accordance with the applied second gesture classification context. Receiving the user input that causes the gesture classification context to be applied may include receiving, by the computer system, user input that selects an application within a user interface. Receiving the user input that causes the gesture classification context to be applied may include receiving, by the computer system, user input that causes a cursor to hover over an icon presented by the user interface. Calculating the first set of metrics to differentiate among only the first subset of gestures may include calculating, by the computer system, metrics for each gesture of the first subset of gestures, wherein the metrics for each gesture of the first subset of gestures is at least partially based on gesture training data and other gestures of the first subset of gestures. Receiving the indication of the second subset of gestures from the set of available gestures and calculating the second set of metrics for the second subset of gestures to differentiate among only the second subset of gestures may occur in response to an application being installed at the computer system. Receiving the indication of the second subset of gestures from the set of available gestures and calculating the second set of metrics for the second subset of gestures to differentiate among only the second subset of gestures may occur during creation of a gesture subset database. The gesture subset database may include gesture classification contexts for multiple subsets of the set of available gestures.

In some embodiments, a system for recognizing a gesture is presented. The system may include one or more processors. The system may include a memory communicatively coupled with and readable by the one or more processors and having stored therein processor-readable instructions. The processor-readable instructions, when executed by the one or more processors, may cause the one or more processors to receive user input that causes a gesture classification context to be applied from a plurality of gesture classification contexts available for a gesture analysis engine. The processor-readable instructions, when executed by the one or more processors, may cause the one or more processors to apply the gesture classification context to the gesture analysis engine. The processor-readable instructions, when executed by the one or more processors, may cause the one or more processors to, after applying the gesture classification context, receive data indicative of the gesture performed by a user. The processor-readable instructions, when executed by the one or more processors, may cause the one or more processors to identify using the gesture analysis engine, the gesture in accordance with the applied gesture classification context.

Embodiments of such a system may include one or more of the following features: The processor-readable instructions, when executed by the one or more processors, may cause the one or more processors to, prior to receiving the user input, calculate a first set of metrics to differentiate among only a first subset of gestures selected from a set of available gestures. Only the first subset of gestures may be eligible to be identified when the gesture classification context is active. The processor-readable instructions, when executed by the one or more processors, may cause the one or more processors to receive an indication of a second subset of gestures from the set of available gestures. Each gesture of the second subset of gestures may be valid in a second gesture classification context. The processor-readable instructions, when executed by the one or more processors, may cause the one or more processors to calculate a second set of metrics for the second subset of gestures to differentiate among only the second subset of gestures. Only the second subset of gestures may be eligible to be identified when the second gesture classification context is active. The second subset of gestures and the first subset of gestures may contain at least one different gesture. The processor-readable instructions, when executed by the one or more processors, may cause the one or more processors to, after calculating the second set of metrics, receive user input that causes the second gesture classification context to be applied to the gesture analysis engine. The processor-readable instructions, when executed by the one or more processors, may cause the one or more processors to, after applying the second gesture classification context, receive data indicative of a second gesture performed by the user.

Additionally or alternatively, embodiments of such a system may include one or more of the following features: The processor-readable instructions, when executed by the one or more processors, may cause the one or more processors to interpret the second gesture in accordance with the applied second gesture classification context. The processor-readable instructions that cause the one or more processors to receive the user input that causes the gesture classification context to be applied may include processor-readable instructions which, when executed, cause the one or more processors to receive user input that selects an application within a user interface. The processor-readable instructions that cause the one or more processors to receive the user input that causes the gesture classification context to be applied may include processor-readable instructions which, when executed, cause the one or more processors to receive user input that causes a cursor to hover over an icon presented by the user interface. The processor-readable instructions that cause the one or more processors to calculate the first set of metrics to differentiate among only the first subset of gestures may include processor-readable instructions which, when executed, cause the one or more processors to calculate metrics for each gesture of the first subset of gestures, wherein the metrics for each gesture of the first subset of gestures is at least partially based on gesture training data and other gestures of the first subset of gestures.

Additionally or alternatively, embodiments of such a system may include one or more of the following features: The processor-readable instructions which, when executed, cause the one or more processors to receive the indication of the second subset of gestures from the set of available gestures and calculate the second set of metrics for the second subset of gestures to differentiate among only the second subset of gestures; may be executed in response to an application being installed at the computer system. The processor-readable instructions which, when executed, cause the one or more processors to receive the indication of the second subset of gestures from the set of available gestures and calculate the second set of metrics for the second subset of gestures to differentiate among only the second subset of gestures may be executed as part of processor-readable instructions which, when executed by the one or more processors, cause the one or more processors to create a gesture subset database, wherein the gesture subset database comprises gesture classification contexts for multiple subsets of the set of available gestures.

In some embodiments, a non-transitory processor-readable medium for recognizing a gesture is presented. The non-transitory processor-readable medium may include processor-readable instructions configured to cause one or more processors to receive user input that causes a gesture classification context to be applied from a plurality of gesture classification contexts available for a gesture analysis engine. The non-transitory processor-readable medium may include processor-readable instructions configured to cause one or more processors to apply the gesture classification context to the gesture analysis engine. The non-transitory processor-readable medium may include processor-readable instructions configured to cause one or more processors to, after applying the gesture classification context, receive data indicative of the gesture performed by a user. The non-transitory processor-readable medium may include processor-readable instructions configured to cause one or more processors to identify using the gesture analysis engine, the gesture in accordance with the applied gesture classification context.

Embodiments of such a non-transitory processor-readable medium may include one or more of the following features: The processor-readable instructions may be further configured to cause the one or more processors to, prior to receiving the user input, calculate a first set of metrics to differentiate among only a first subset of gestures selected from a set of available gestures. Only the first subset of gestures may be eligible to be identified when the gesture classification context is active. The processor-readable instructions may be further configured to cause the one or more processors to receive an indication of a second subset of gestures from the set of available gestures. Each gesture of the second subset of gestures may be valid in a second gesture classification context. The processor-readable instructions may be further configured to cause the one or more processors to calculate a second set of metrics for the second subset of gestures to differentiate among only the second subset of gestures. Only the second subset of gestures may be eligible to be identified when the second gesture classification context is active. The second subset of gestures and the first subset of gestures may contain at least one different gesture. The processor-readable instructions may be further configured to cause the one or more processors to, after calculating the second set of metrics, receive user input that causes the second gesture classification context to be applied to the gesture analysis engine.

Additionally or alternatively, embodiments of such a non-transitory processor-readable medium may include one or more of the following features: The processor-readable instructions may be further configured to cause the one or more processors to, after applying the second gesture classification context, receive data indicative of a second gesture performed by the user. The processor-readable instructions may be further configured to cause the one or more processors to interpret the second gesture in accordance with the applied second gesture classification context. The processor-readable instructions configured to cause the one or more processors to receive the user input that causes the gesture classification context to be applied may include processor-readable instructions configured to cause the one or more processors to receive user input that selects an application within a user interface. The processor-readable instructions configured to cause the one or more processors to receive the user input that causes the gesture classification context to be applied may include processor-readable instructions configured to cause the one or more processors to receive user input that causes a cursor to hover over an icon presented by the user interface. The processor-readable instructions configured to cause the one or more processors to calculate the first set of metrics to differentiate among only the first subset of gestures may include processor-readable instructions configured to cause the one or more processors to calculate metrics for each gesture of the first subset of gestures, wherein the metrics for each gesture of the first subset of gestures is at least partially based on gesture training data and other gestures of the first subset of gestures.

Additionally or alternatively, embodiments of such a non-transitory processor-readable medium may include one or more of the following features: The processor-readable instructions configured to cause the one or more processors to receive the indication of the second subset of gestures from the set of available gestures and calculate the second set of metrics for the second subset of gestures to differentiate among only the second subset of gestures; may be executed in response to an application being installed at the computer system. The processor-readable instructions configured to cause the one or more processors to receive the indication of the second subset of gestures from the set of available gestures and calculate the second set of metrics for the second subset of gestures to differentiate among only the second subset of gestures may be executed as part of processor-readable instructions configured to cause the one or more processors to create a gesture subset database, wherein the gesture subset database comprises gesture classification contexts for multiple subsets of the set of available gestures.

In some embodiments, an apparatus for recognizing a gesture is presented. The apparatus may include means for receiving user input that causes a gesture classification context to be applied from a plurality of gesture classification contexts that are available for a means for gesture analysis. The apparatus may include means for applying the gesture classification context to the means for gesture analysis. The apparatus may include means for receiving data indicative of the gesture performed by a user after applying the gesture classification context. The apparatus may include means for identifying using the means for gesture analysis, the gesture in accordance with the applied gesture classification context.

Embodiments of such an apparatus may include one or more of the following features: The apparatus may include means for calculating a first set of metrics to differentiate among only a first subset of gestures selected from a set of available gestures prior to receiving the user input. Only the first subset of gestures may be eligible to be identified when the gesture classification context is active. The apparatus may include means for receiving an indication of a second subset of gestures from the set of available gestures. Each gesture of the second subset of gestures may be valid in a second gesture classification context. The apparatus may include means for calculating a second set of metrics for the second subset of gestures to differentiate among only the second subset of gestures. Only the second subset of gestures may be eligible to be identified when the second gesture classification context is active. The second subset of gestures and the first subset of gestures may contain at least one different gesture. The apparatus may include means for receiving user input that causes the second gesture classification context to be applied to the means for gesture analysis after calculating the second set of metrics.

Additionally or alternatively, embodiments of such an apparatus may include one or more of the following features: The apparatus may include means for receiving data indicative of a second gesture performed by the user after applying the second gesture classification context. The apparatus may include means for interpreting the second gesture in accordance with the applied second gesture classification context. The means for receiving the user input that causes the gesture classification context to be applied may include means for receiving user input that selects an application within a user interface. The means for receiving the user input that causes the gesture classification context to be applied further may include means for receiving user input that causes a cursor to hover over an icon presented by the user interface. The means for calculating the first set of metrics to differentiate among only the first subset of gestures may include means for calculating metrics for each gesture of the first subset of gestures, wherein the metrics for each gesture of the first subset of gestures is at least partially based on gesture training data and other gestures of the first subset of gestures. The means for receiving the indication of the second subset of gestures from the set of available gestures and the means for calculating the second set of metrics for the second subset of gestures to differentiate among only the second subset of gestures may be contingent on an application being installed at the computer system. The means for receiving the indication of the second subset of gestures from the set of available gestures and the means for calculating the second set of metrics for the second subset of gestures to differentiate among only the second subset of gestures may be part of a means for creating a gesture subset database. The gesture subset database may include gesture classification contexts for multiple subsets of the set of available gestures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
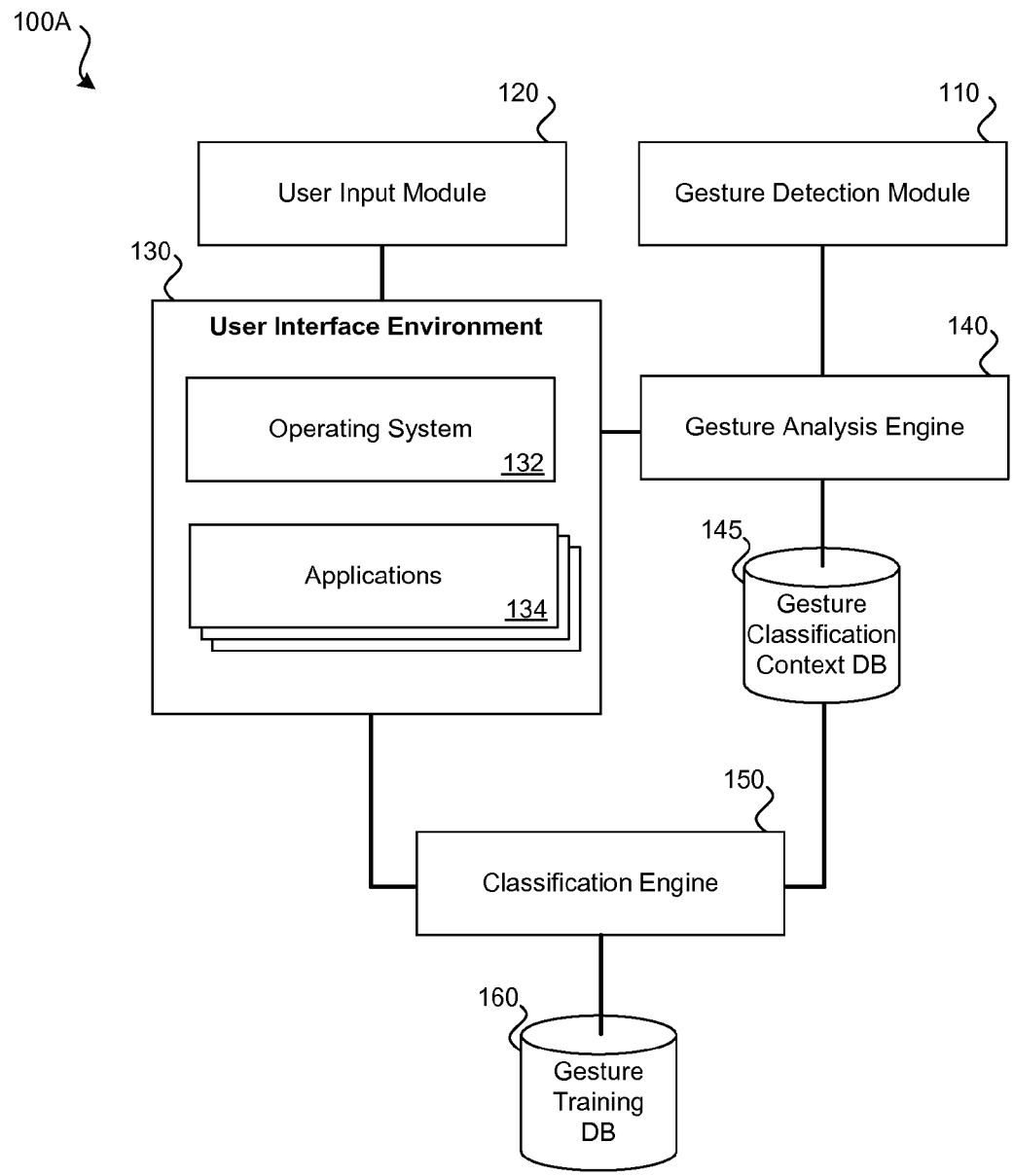
FIG. 1A illustrates an embodiment of a system for recognizing a gesture using context-sensitive gesture classification.

Using a hand or other body party (which may or may not involve holding an object such as a wand or a sensor), a user may perform a gesture to provide input to a computerized device. While a person may be able to perform a wide variety of gestures, only particular gestures may recognized as valid input in particular contexts of a user interface environment. Possible user interfaces include a graphical user interface of a computer system (e.g., laptop computer, desktop computer, tablet computer, wireless device, mobile phone) and an interface of a computerized head mounted display (HMD). For instance, via an interface, a user may be able to manipulate a cursor or other form of interaction element. Depending on the context of the interaction element, which gestures result in valid commands may vary. As an example, if a user is manipulating an interface of an HMD and is interacting with a first icon (e.g., is looking at the first icon) related to a first application, only snap, twist, and pinch gestures may be valid and associated with commands for the first application. However, if the user is interacting with a second icon associated with a second application, circle, punch, swipe, snap, and halt gestures may be valid and associated with commands for the second application.

Rather than identifying a gesture performed by a user from all gestures which can be identified by the computer system and providing an indication of which gesture is identified to the application being interacted with on the computerized device, a gesture performed by a user may be recognized in the context of the user interface environment with which the user is interacting. The identification of a gesture performed by the user may be at least partially based on the context of the user interface environment with which the user is interacting. Therefore, prior to a user interacting with the user interface, a gesture classification context may be created for multiple contexts of the user interface environment. In each of these multiple gesture classification contexts, a subset of available gestures may be identifiable and distinguishable from other gestures of the subset based on calculated metrics. Other gestures, which do not correspond to commands and are not part of the subset, may not be identifiable. The gesture classification context that is made active based on a state of the user interface environment may be used to identify a gesture a user has performed.

The characteristics (such as the electrical characteristics detected in a user's wrist or images of a user) that are analyzed to identify the performed gesture may vary based on which gestures are valid commands in a particular context. For example, if both a pinch gesture and a grasp gesture are valid commands in a first gesture classification context, metrics may be present in the first gesture classification context to identify the difference between these two gestures. However, in a second gesture classification context, if the pinch gesture corresponds to a valid command but the grasp gesture does not, the second gesture classification context may not have metrics to differentiate a pinch gesture from a grasp gesture. Therefore, a gesture performed by a user in the first gesture classification context that would have been identified as a grasp gesture may be identified as a pinch gesture, some other gesture that is valid within the second gesture classification context, or may not be identified in the second gesture classification context.

Multiple gesture classification contexts may be created ahead of user interaction with a user interface environment. Therefore, creation of gesture classification contexts may be performed before a user attempts to perform a gesture in a particular context. For example, when a new application is installed on a computer system, it may be determined which subset gestures from a set of gestures available on the computer system are associated with valid commands. Metrics for a gesture classification context may be created such that only gestures within the subset of gesture can be identified and distinguished from each other. Therefore, if an invalid gesture (a gesture not part of the subset) is performed, the invalid gesture may be either ignored or identified as a gesture that is part of the subset. As a user changes the context of the user interface environment, such as by looking at or hovering an interaction element (e.g., cursor) over different graphical elements (e.g., icons), different gesture classification contexts may be activated. Whichever gesture classification context is currently active may govern how a gesture performed by the user will be identified. Therefore, if a gesture is performed while a particular gesture classification context is active, the gesture is identified based on metrics of that particular gesture classification context.

FIG. 1A illustrates an embodiment of a system 100A for recognizing a gesture using context-sensitive gesture classification. System 100A may include multiple components for use in recognizing a gesture using context-sensitive gesture classification. System 100A may include: gesture detection module 110, user input module 120, user interface environment 130, gesture analysis engine 140, gesture classification context database 145, classification engine 150, and gesture training database 160. It should be understood that such components may be implemented using computerized hardware, firmware, and/or software. One or more computer systems, such as computer system 700 of FIG. 7 may perform at least some of the functions of the components of system 100A. Further, it should be understood that the components of system 100A of FIG. 1A are represented by a simplified block diagram, the functions performed by a component may be performed by multiple subcomponents. Likewise, in some embodiments, functions performed by multiple components of system 100A may be performed by a single hardware, firmware, or software component, such as a general-purpose processor.

Gesture detection module 110 may be used to capture information from which a gesture performed by a user may be identified. In some embodiments, gesture detection module 110 may include an image capture device (e.g., camera) that captures images of at least a portion of a user's body (e.g., hand). Multiple images of at least a portion of the user's body may be analyzed to determine movement and/or position of at least a portion of the user's body. For example, a user may move his hand (e.g. wave) or position his hand (e.g., make a fist) to perform a gesture. From images captured by gesture detection module 110, movement (i.e., change in position over time) and/or a position of the user's hand may be detected. In some embodiments, gesture detection module 110 may include one or more sensors configured to detect movement, such as one or more gyroscopes and/or accelerometers. For example, gestures may be performed by a user by holding or wearing gesture detection module 110. For instance, if system 100A is present in a mobile device, the user may perform hand-based gestures while holding the mobile device. In some embodiments, gesture detection module 110 may include one or more sensors configured to detect electrical activity of a user's muscles. For instance, a user may wear one or more sensors on his arm and/or wrist that output data that can be analyzed to determine how the user is positioning or moving his hand. Further, gesture detection module 110 may include a combination of multiple of the above detailed types of sensors. In some embodiments, other forms of gesture detection module 110 may be present to detect a movement performed by the user.

User input module 120 may allow a user to provide input to user interface environment 130. User input module 120 may include a head-mounted display (HMD), keyboard, mouse, trackball, etc. Referring to an HMD, the user may provide input by looking at real-world or virtual objects. In some embodiments, to determine the gesture classification context that is active, a virtual object displayed by the HMD or real-world object at which the user is looking may be determined. Referring to a mouse being used as user input module 120, a user may move a cursor by physically moving the mouse. In some embodiments, to determine the gesture classification context that is active, it may be determined an object over which the cursor is hovering. It should be understood that various other forms of input devices exist through which a user can interact with user interface environment 130, such as voice commands. Input from user input module 120 may be used by user interface environment 130 to activate a particular gesture classification context. As such, based on input from user input module 120, a particular gesture classification context may be made active from multiple available gesture classification contexts.

User interface environment 130 may represent firmware and/or software being executed and/or available for execution by system 100A. For example, user interface environment 130 may include operating system 132 and applications 134. Operating system 132 may manage and output a user interface through which a user can interact with applications 134. Applications 134 may be installed as part of operating system 132 or may be installed after operating system 132 has been installed. User interface environment 130 may be configured to provide an output to gesture analysis engine 140 which indicates a gesture classification context that is active. For instance, if a user causes a cursor to hover over an icon associated with an application of applications 134, user interface environment 130 may provide an indication of which gesture classification context should be active to gesture analysis engine 140. Applications 134 and operating system 132 may be permitted to use gestures from a predefined set of available gestures as valid commands. For instance, applications 134 and operating system 132 may select all or a subset of gestures for use as valid commands from a set of gestures. In some embodiments, it may be possible for applications 134 and/or operating system 132 to provide training data for a new gesture to be added to the set of gestures.

Gesture analysis engine 140 may be configured to identify a gesture using data received from gesture detection module 110, user interface environment 130, and gesture classification context database 145. Gesture analysis engine 140 may be configured to receive an indication of a gesture classification context from user interface environment 130. Based on the gesture classification context, gesture analysis engine 140 may access a gesture classification context from gesture classification context database 145. In some embodiments, a single gesture classification context may be active at a given time. Data indicative of a gesture performed by a user received from gesture detection module 110 may be analyzed by gesture analysis engine 140 using the metrics of the active gesture classification context loaded from gesture classification context database 145. Gesture analysis engine 140 may output an indication of a gesture identified based on the active gesture classification context to user interface environment 130. The indication of the gesture output to user interface environment 130 may serve as a command (or some other form of input) to operating system 132 and/or an application of application 134. Since whichever gesture classification context is active corresponds to the context of user interface environment 130, an indication of a gesture output to user interface environment 130 can be expected to be a valid command or other form of input.

Gesture classification context database 145 may store multiple gesture classification contexts. For each gesture classification context, classification metrics may have been determined by classification engine 150. For a particular gesture classification context within gesture classification context database 145, metrics may only be present to distinguish a valid gesture from other valid gestures available within that gesture classification context. In some embodiments, each gesture classification context corresponds to a different application of applications 134. By user interface environment 130 being placed in the context of an application of applications 134, that application's gesture classification context from gesture classification context database 145 may be made active. Also, based on the state of operating system 132, a gesture classification context from gesture classification context database 145 may be made active. A gesture classification context within gesture classification context database 145 may have its metrics created prior to the gesture classification context being made active. As such, at the time the gesture classification context is made active, the metrics of the gesture classification context do not need to be calculated. Rather, in some embodiments, metrics for gesture classification context may be loaded or calculated for gesture classification context database 145 at the time the corresponding application of applications 134 is installed or operating system 132 is installed.

In various embodiments, it should be understood that applications 134 are not interpreting gestures from data received from gesture detection module 110 directly. Rather, a software, firmware, or hardware component(s) separate from applications 134 identify gestures performed by a user. Applications 134 may rather accept input that indicates which gesture has been performed. For example, if a user performs a swipe left-to-right gesture as input to an application of applications 134, the application does not analyze the images (or other data indicative of the gesture) received from gesture detection module 110, rather gesture analysis engine 140 performs the analysis with the application receiving an indication of which gesture was identified by gesture analysis engine 140.

Classification engine 150 may be configured to create gesture classification contexts for storage within gesture classification context database 145. Classification engine 150 may have access to training data based on a number of persons performing various gestures and/or training data specific to the user(s) of system 100A. For example, training data for hundreds or thousands of different users performing a circle gesture may be stored within gesture training database 160. The gesture training data stored within gesture training database 160 may be for the predefined set of available gestures. As such, applications 134 within user interface environment 130 may be restricted to using gestures that are within the predefined set of gestures. For instance, the predefined set of available gestures may include fifty gestures, an application of applications 134 may identify a subset of these gestures, such as ten or some other number of gestures, that are to serve as valid input for the application, while another application may identify all fifty as serving as valid input.

Classification engine 150 may be configured to receive an indication of a subset of gestures from the predefined set of gestures that are to serve as valid input to an application of applications 134 (or some other portion of user interface environment 130). Based on the subset of gestures that are identified, classification engine 150 may calculate metrics sufficient to be able to distinguish gestures from within the subset of gestures from other gestures within the subset of gestures. Notably, metrics for gestures that are not within the subset of gestures may not be created. Therefore, gestures not within the subset of gestures may not be identified or distinguished from gestures within the subset of gestures. For example, if a subset of gestures contains a circle gesture and a triangle gesture, classification engine 150 may compute metrics using data from gesture training database 160 sufficient to distinguish a circle gesture from a triangle gesture performed by a user. Therefore, if the user performs a triangle gesture or a circle gesture in an active gesture classification context created based on the circle and triangle gestures, a triangle gesture and circle gesture performed by the user may each be properly identified. However, if for a second gesture classification context, the circle gesture is present within the subset of gestures but the triangle gesture is not, classification engine 150 does not compute metrics to distinguish these two gestures from each other. Therefore, if a user performs a triangle gesture in the second gesture classification context that was created without metrics to distinguish the triangle gesture, the performed triangle gesture may be interpreted as another gesture (e.g., as a circle gesture) or may be ignored.

Creation of the actual metric values may involve various processes, such as those detailed in "Protractor: A Fast and Accurate Gesture Recognizer" by Li, Yang; Google Research 2010, which is hereby incorporated by reference. Those with skill in the art will recognize how gesture metrics can be computed using the information provided in this document with other known techniques, including: the use of statistical correlation and dependence to differentiate collected data; cosine similarity, which can be used to measure the similarity between measured vectors; a Jaccard index (Jaccard similarity coefficient), which is a form of statistic used for comparing the similarity and diversity of sets of data; and a Hamming distance, which can be used to measure the minimum number of substitutions required to make two strings of data match. Other techniques may also be possible.

In some embodiments, rather than having classification engine 150 compute metrics based on an identified subset of gestures from a set of gestures, classification engine 150 may produce gesture classification contexts for all possible (or all likely) subsets of gestures. Such an arrangement may only be practicable if a limited number of subsets are possible. For example, if the set of gestures includes only ten gestures, a total number of gesture classification contexts to be created by classification engine 150 may be 1023. However, if the set of gestures includes fifty gestures, a total number of gesture classification contexts to be created by classification engine 150 may be much larger and impractical to store (and/or compute). If all of the (likely) subsets of gestures are created by classification engine 150, upon an indication of a subset of gestures being identified to classification engine 150 by an application or the operating system, the classification engine 150 may select the appropriate gesture classification context that corresponds to the identified subset of gestures and load the gesture classification context to gesture classification context database 145. In some embodiments, all possible or likely gesture classification contexts are loaded to gesture classification context database 145.

In the illustrated embodiment of FIG. 1A, gesture analysis engine 140 and classification engine 150 are illustrated as being separate from user interface environment 130. It should be understood that such engines may be implemented as software components which may be executed as part of user interface environment 130, such as through operating system 132 using one or more general purpose processors. In other embodiments, such engines may be implemented using dedicated firmware and/or hardware that is separate from user interface environment 130.

Figure 1B:
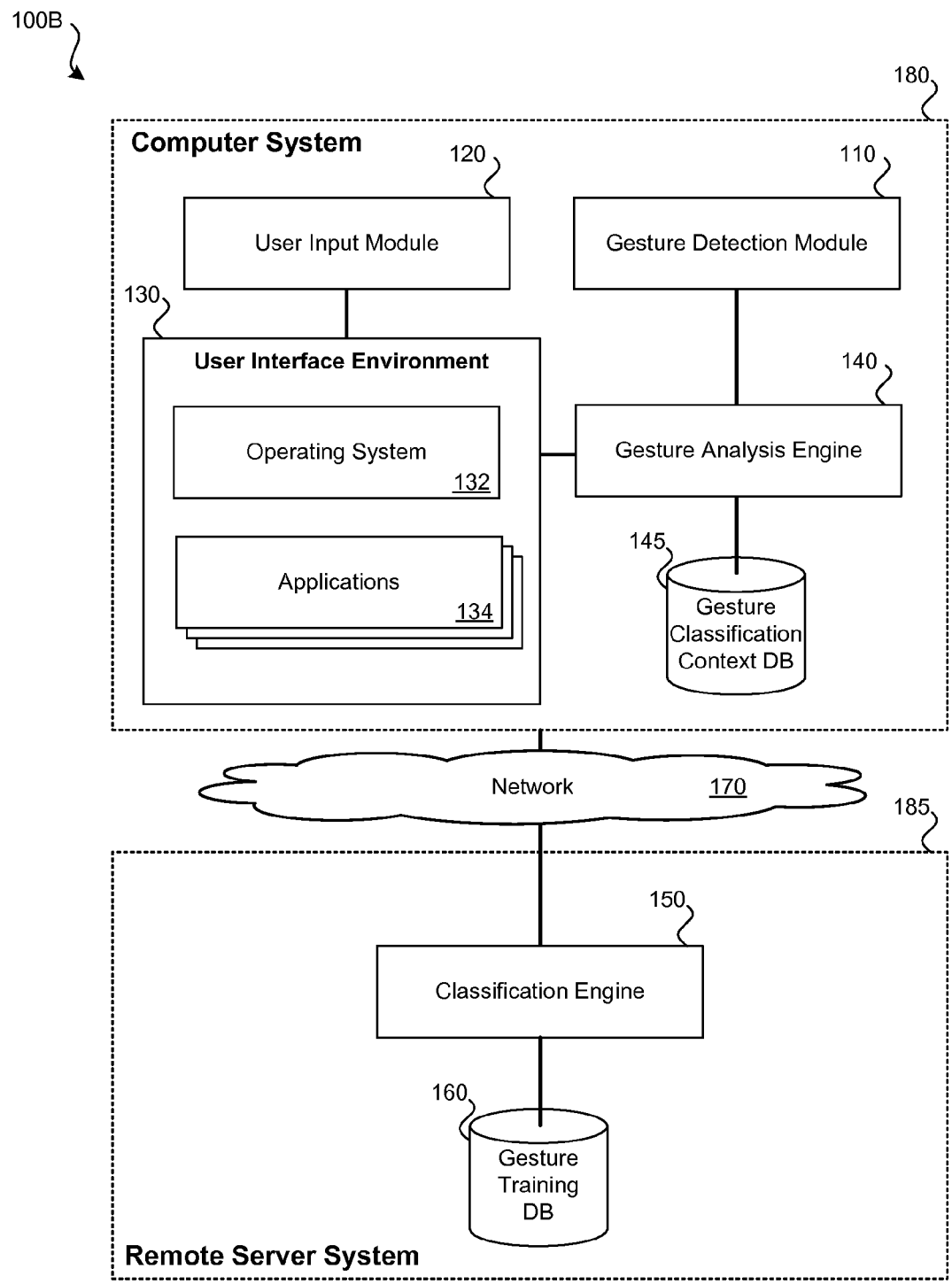
FIG. 1B illustrates an embodiment of a system that is distributed for recognizing a gesture using context-sensitive gesture classification.

All components of system 100A of FIG. 1A may be part of a single device. For instance, each component may be present as part of a computerized system (e.g., home computer, television, smart phone). In some embodiments, components of such a system may be distributed. FIG. 1B illustrates an embodiment of a system 100B that is distributed for recognizing a gesture using context-sensitive gesture classification. Rather than having the classification performed locally by a computerized system, classification services may be performed remotely by a remote server system. Computer system 180 may communicate, via network 170, with remote server system 185. Remote server system 185 may include one or more computer systems, which may be networked in a distributed computing arrangement.

Network 170 may represent one or more public and/or private computerized networks, such as a cellular network, the Internet, and/or a corporate intranet. An application that is installed in user interface environment 130 may provide an indication to classification engine 150 via network 170 that indicates a subset of gestures from a set of available gestures, each gesture in the subset of gestures may be available to serve as a valid input or command to the application. Classification engine 150, using data from gesture training database 160, may create the metrics for a corresponding gesture classification context. This gesture classification context may be provided to gesture classification context database 145 for storage, via network 170. When the context of the application is active, this gesture classification context may be made active. In some embodiments, when the subset of gestures is indicated to classification engine 150, it selects an appropriate previously created gesture classification context to gesture classification context database 145 for storage and use. While remote server system 185 is illustrated as containing components related to classification, it should be understood that additional or fewer components of systems 100A and 100B may be incorporated as part of remote server system 185.

Whether classification engine 150 is local or remote to computer system 180, various steps may be performed to calculate the metrics used to differentiate gestures from within a subset of gestures from other gestures within the subset of gestures. These metrics may be computed as similarity scores between different gestures represented in a database. For example, one possibility is to represent gestures as sequence of [X,Y,Z] position vectors in space, and then similarity scores can be computed as the sum of inner products between sequences of vectors. There are multiple ways to calculate similarity and multiple ways to represent gestures in a stored database.

Figure 2:
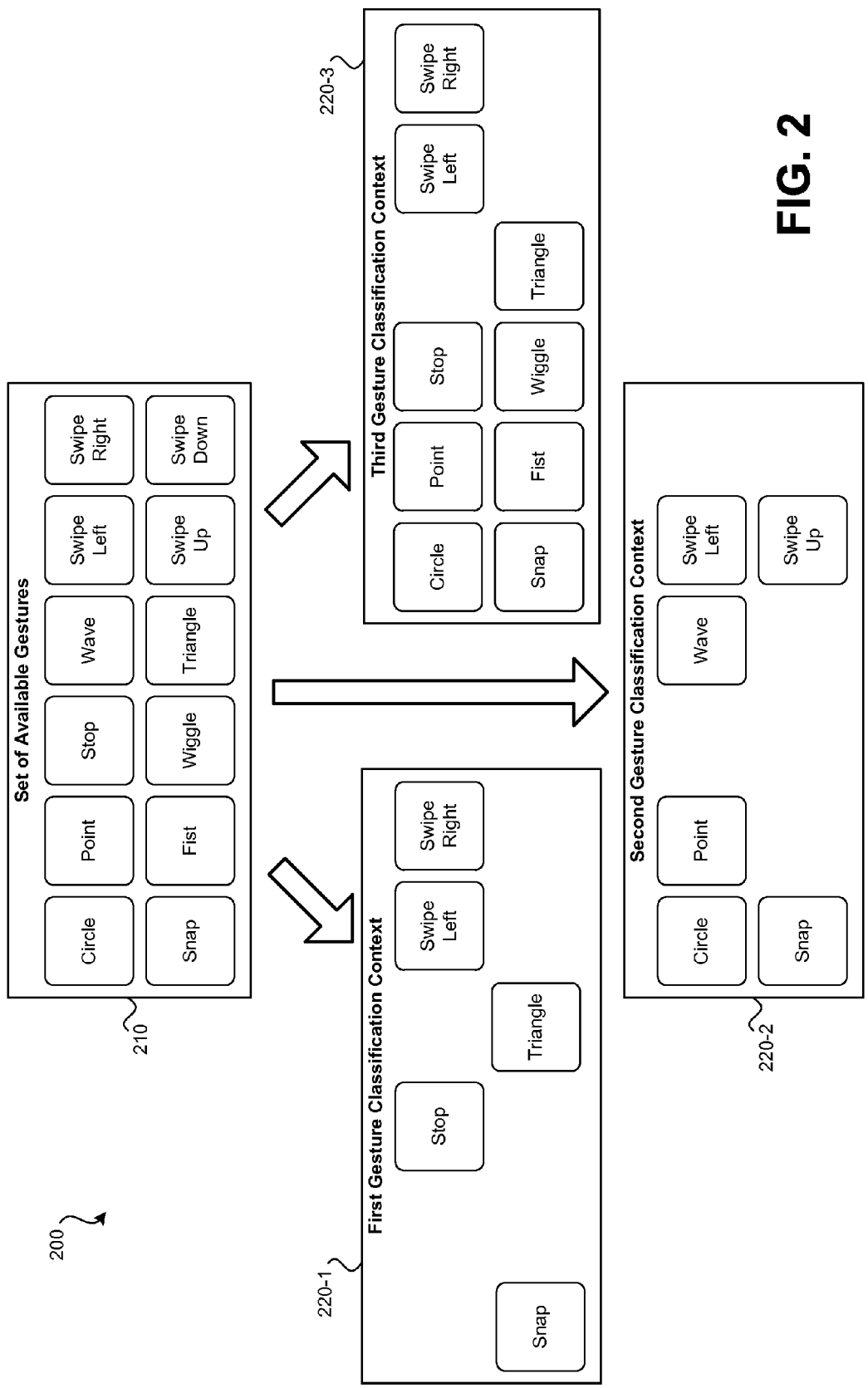
FIG. 2 illustrates an embodiment of a graphical representation of multiple context-sensitive gesture classifications.

FIG. 2 illustrates an embodiment of a graphical representation 200 of multiple gesture classification contexts. Graphical representation 200 is intended for visualization purposes in understanding how different gesture classification context can be created and used. For instance, graphical representation 200 may be used for visualization purposes to understand how applications 134 (and/or other parts of user interface environment 130) of FIGS. 1A and 1B may correspond to different gesture classification contexts which are specifically configured for use in differentiating between gestures available within that particular gesture classification context.

Set of available gestures 210 may represent all gestures from which an application or other part of a user interface environment is permitted to use within the application's subset of gestures. Referring to FIGS. 1A and 1B, gesture training database 160 may contain only training data for gestures defined within set of available gestures 210.

An application, such as an application of applications 134, may provide an indication to a classification engine of a subset of gestures from the set of available gestures which are to be considered valid input for the application. These gestures which are indicated by the application, or other part of the user interface environment, may be used to create a gesture classification context for the subset of gestures from the available set of gestures. Referring to graphical representation 200 of FIG. 2, three gesture classification contexts 220 for different subsets of gestures from the set of available gestures have been created. Each of these subsets of gestures may correspond to a different application or other portion of the user interface environment.

First gesture classification context 220-1 may correspond to a first application in which five gestures are recognized as valid input. In first gesture classification context 220-1, a stop gesture, a triangle gesture, a swipe left gesture, a swipe right gesture, and a snap gesture are available. These five gestures are a subset of gestures from set of available gestures 210. When the first gesture classification context 220-1 is active, a gesture analysis engine, such as gesture analysis engine 140 of system 100A and system 100B, may only be able to identify gestures having metrics with first gesture classification context 220-1. Therefore, if the user performs a stop gesture (e.g., a vertically oriented palm facing a camera), the gesture analysis engine may be able to distinguish this stop gesture from a snap gesture, a triangle gesture, a swipe left gesture, and a swipe right gesture. However, a gesture that does not have metrics present within first gesture classification context 220-1 that is performed by a user may be either ignored or classified as another gesture from the subset of gestures that does have associated metrics within first gesture classification context 220-1. As an example, if the user, while the gesture analysis engine is within the first gesture classification context 220-1, performs a wave gesture, this gesture may be either ignored or classified as a gesture that is similar to the performed gesture. For example, the wave gesture performed by the user may be classified as a stop gesture (possibly because they both involve vertically raised palms facing a camera of a gesture capture module).

The metrics calculated for first gesture classification context 220-1 may be configured to differentiate between the gestures within first gesture classification context 220-1, but not gestures that are not part of first gesture classification context 220-1. When a user has provided input to a user interface environment that causes a particular gesture classification context to be active, it may be assumed that the user intends on performing a gesture that has associated metrics within the active gesture classification context. For instance, if the user has selected the application corresponding to first gesture classification context 220-1, it may be assumed that if the user performs a gesture, he is performing gestures that will be valid within this context. Therefore, the user would likely be performing either a snap gesture, a triangle gesture, a stop gesture, a swipe left gesture, or a swipe right gesture. By restricting the identified gesture to one of the gestures within the subset of gestures of first gesture classification context 220-1, the accuracy of gesture identification may be increased. For instance, the situation of a gesture being improperly identified as a gesture that is not available within the first gesture classification context 220-1 may be eliminated.

Second gesture classification context 220-2 may correspond to a second application in which six gestures are recognized as valid input. In second gesture classification context 220-2, a circle gesture, a point gesture, a wave gesture, a swipe left gesture, a swipe up gesture, and a snap gesture are available. These six gestures represent a subset of gestures from set of available gestures 210. While in first gesture classification context 220-1 metrics were determined and stored sufficient to differentiate each gesture from within first gesture classification context 220-1 from each other, second gesture classification context 220-2 requires that metrics be stored to differentiate the six gestures of second gesture classification context 220-2 from each other. Therefore, for example, while a snap gesture is present within both the first gesture classification context 220-1 and second gesture classification context 220-2, the metrics for analyzing the snap gesture may be different between the two contexts. In one respect, the metrics may be different because in first gesture classification context 220-1, it is not necessary to differentiate a snap gesture from a point gesture, however, in second gesture classification context 220-2, a snap gesture may be required to be differentiated from a point gesture because both of these gestures are valid within second gesture classification context 220-2.

Within second gesture classification context 220-2, a gesture analysis engine, such as gesture analysis engine 140 of system 100A and system 100B, may only be able to identify gestures that are within second gesture classification context 220-2. A gesture that is not part of second gesture classification context 220-2 that is performed by a user may be either ignored or classified as a gesture from the subset of gestures of second gesture classification context 220-2.

Since the metrics used to analyze performed gestures within first gesture classification context 220-1 and second gesture classification context 220-2 are different, a same gesture performed by a user in each of these gesture classification contexts may be interpreted differently by a gesture analysis engine depending on which gesture classification context is active. For example, if in first gesture classification context 220-1, a user performs a stop gesture, the gesture analysis engine using the metrics of first gesture classification context 220-1 may properly identify the stop gesture. However, if the gesture analysis engine was in second gesture classification context 220-2, the metrics used to analyze the gesture performed by the user may not identify the stop gesture. Rather the performed gesture may be either ignored, because the metrics of second gesture classification context 220-2 cannot identify the gesture with a high enough confidence level or the stop gesture may be classified as some other gesture that has metrics within second gesture classification context 220-2. For instance, a stop gesture analyzed using the metrics of second gesture classification context 220-2 may result in a similar gesture that is available within second gesture classification context 220-2 being identified, such as a wave gesture.

The metrics calculated for second gesture classification context 220-2 may be configured to differentiate between the gestures within second gesture classification context 220-1, but not gestures that are not part of first gesture classification context 220-1. When a user has placed a user interface environment in a particular context, it may be assumed that the user intends on performing a gesture that corresponds to the context that the user interface environment is in. Further, the ability to identify gestures within the subset of that particular context may be increased. For instance, if the user has selected the application corresponding to second gesture classification context 220-2, it may be assumed that if the user performs a gesture, he is performing a gesture that will be valid for within this second gesture classification context 220-2. Therefore, the user would be expected to be performing either a snap gesture, a circle gesture, a point gesture, a wave gesture, a swipe left gesture, or a swipe up gesture.

Third gesture classification context 220-3 may correspond to a third application (or some other part of a user interface environment) in which nine gestures are recognized as valid input. In third gesture classification context 220-3, a circle gesture, a point gesture, a stop gesture, a swipe left gesture, a swipe right gesture, a snap gesture, a first gesture, a wiggle gesture, and a triangle gesture are available. These nine gestures represent a subset of gestures from set of available gestures 210. While in first gesture classification context 220-1 metrics were determined and stored sufficient to differentiate each gesture from within first gesture classification context 220-1 from each other, and metrics were determined and stored sufficient to differentiate each gesture from within second gesture classification context 220-2 from each other, third gesture classification context 220-3 requires that metrics be stored to differentiate the nine gestures of third gesture classification context 220-3 from each other. Therefore, for example, while a circle gesture is present within both second gesture classification context 220-2 and third gesture classification context 220-3, the metrics for analyzing the circle gesture may be different between the two contexts. In one respect, the metrics may be different because in second gesture classification context 220-2 is not necessary to differentiate a circle gesture from a triangle gesture, however, in third gesture classification context 220-3, a circle gesture must be differentiated from a triangle gesture because both of these gestures are valid within third gesture classification context 220-3.

While third gesture classification context 220-3 is active, a gesture analysis engine, such as gesture analysis engine 140 of system 100A and system 100B, may only be able to identify gestures having metrics within third gesture classification context 220-3. A gesture that is not part of third gesture classification context 220-3 that is performed by a user may be either ignored or classified as a gesture from the subset of gestures of third gesture classification context 220-3.

The metrics calculated for third gesture classification context 220-3 may be configured to differentiate between the gestures within third gesture classification context 220-3, but not gestures that are not part of third gesture classification context 220-3. When a user has placed a user interface environment in a particular context, it may be assumed that the user intends on performing a gesture that corresponds to the context that the user interface environment is in. For instance, if the user has selected the application corresponding to third gesture classification context 220-3, it may be assumed that if the user performs a gesture, he is performing a gesture that will be valid for within this third gesture classification context 220-3. Therefore, the user would be expected to be performing either a circle gesture, a point gesture, a stop gesture, a swipe left gesture, a swipe right gesture, a snap gesture, a first gesture, a wiggle gesture, and a triangle gesture.

In FIG. 2, three possible gesture classification contexts, each having a set of metrics, are presented. Each of these gesture classification context 220 may correspond to a different application. It should be understood that in various embodiments, fewer or greater numbers of gesture classification context 220 may be created for set of available gestures 210. Further, the number of gestures in set of available gestures 210 may be fewer or greater. For instance, a set of available gestures 210 may contain fifty possible gestures, therefore the number of possible subsets of gestures for a particular gesture classification context may be great. Each gesture classification context of gesture classification context 220 may have corresponding metrics that are configured to identify and distinguish only gestures within that particular gesture classification context from other gestures within that particular gesture classification context.

Figure 3:
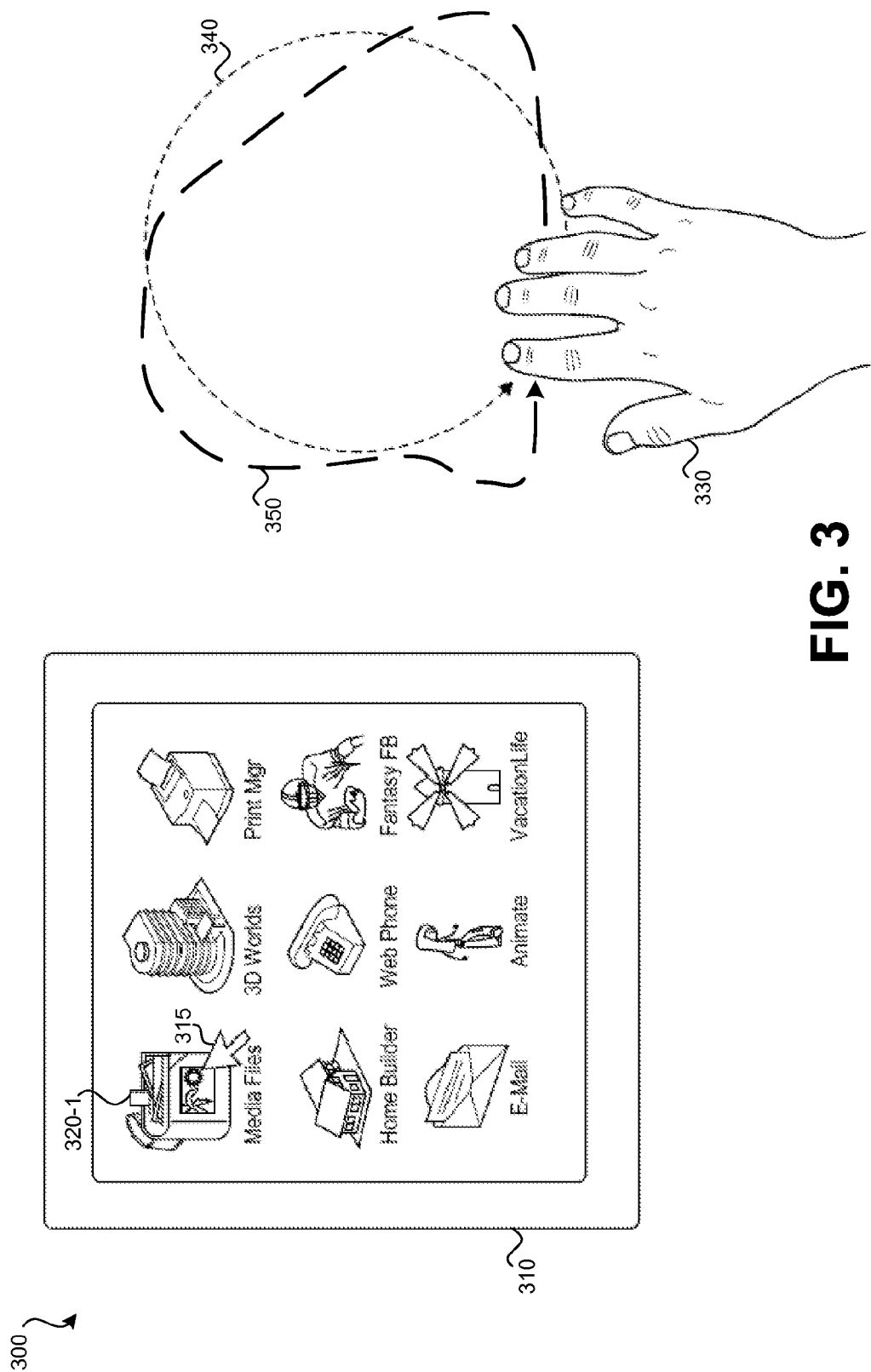
FIG. 3 illustrates an embodiment of a gesture being recognized using context-sensitive gesture classification.

FIG. 3 illustrates an embodiment 300 of a gesture being recognized using context-sensitive gesture classification. Embodiment 300 may involve use of systems 100A or 100B of FIGS. 1A and 1B, respectively. In embodiment 300, a user interface 310 is presented to a user. User interface 310 may be presented by a computer system, such as the illustrated tablet computer. Other forms of computer systems are also possible, including mobile devices, laptop computers, desktop computers, etc. In user interface 310, the user is permitted to select an application from multiple applications using cursor 315. For example, the user may manipulate a mouse to position cursor 315. In other embodiments, rather than manipulating a mouse to receive user input within user interface 310, some other form of user input may be received, such as by a user looking at different parts of user interface 310 (e.g., when an HMD is used). In embodiment 300, when the user manipulates a cursor 315 in user interface 310 to be positioned over icons and/or text corresponding to a particular application, a gesture classification context associated with the particular application is made active. Therefore, in some embodiments, an operating system managing user interface 310 may determine which gesture classification context is active based on cursor 315.

In embodiment 300, cursor 315 has been positioned by the user over icon 320-1, which corresponds to a "media files" application. While cursor 315 is positioned over icon 320-1 (or the text corresponding to icon 320-1), a previously-created gesture classification context that corresponds to the media files application may be made active. While this gesture classification context is active, gestures performed by the user may be analyzed based on the metrics associated with the active gesture classification context.

Referring back to FIG. 2, the gesture classification context made active by cursor 315 hovering over icon 320-1 corresponds to a second gesture classification context 220-2. Therefore, while a second gesture classification context 220-2 is active, metrics are present to differentiate: a circle gesture, a point gesture, a wave gesture, a swipe left gesture, a swipe up gesture, and a snap gesture. While second gesture classification context 220-2 is active, the user may use hand 330 of the user to perform a gesture.

Since cursor 315 is positioned over icon 320-1, it is assumed that any gesture that the user performs is intended as input to the "media files" application. Only gestures of second gesture classification context 220-2 are valid for the media files application; therefore, it can be expected that the user is performing one of the six gestures of second gesture classification context 220-2. In FIG. 3, 2 movement paths 340 and 350 are illustrated. Hand 330 may perform a circle gesture by moving along movement path 340. When this gesture performed by hand 330 is analyzed according to the metrics of second gesture classification context 220-2, it may be classified as a circle gesture. A command indicating or otherwise corresponding to the circle gesture may be provided as input to the media files application over which cursor 315 is hovering.

While movement path 340 illustrates an ideal circle gesture, a user moving hand 330 precisely along movement path 340 may be unlikely. Rather, a user attempting to perform a circle gesture may move hand 330 along a movement path similar to movement path 350. That is, while attempting to perform a circle gesture, the hand 330 of the user may move in a generally circular motion, but which may result in hand 330 moving faster or slower at times and/or not maintaining a constant radius around a center point. Similar variations in how users perform gestures may occur for other types of gestures.

If a user moves hand 330 along movement path 350, this movement path 350 may be analyzed according to the metrics of second gesture classification context 220-2. Based on these metrics, movement path 350 may be determined to correspond to circle gesture, which is valid within second gesture classification context 220-2 and has metrics to differentiate a circle gesture from other gestures performed while second gesture classification context 220-2 is active.

Figure 4:
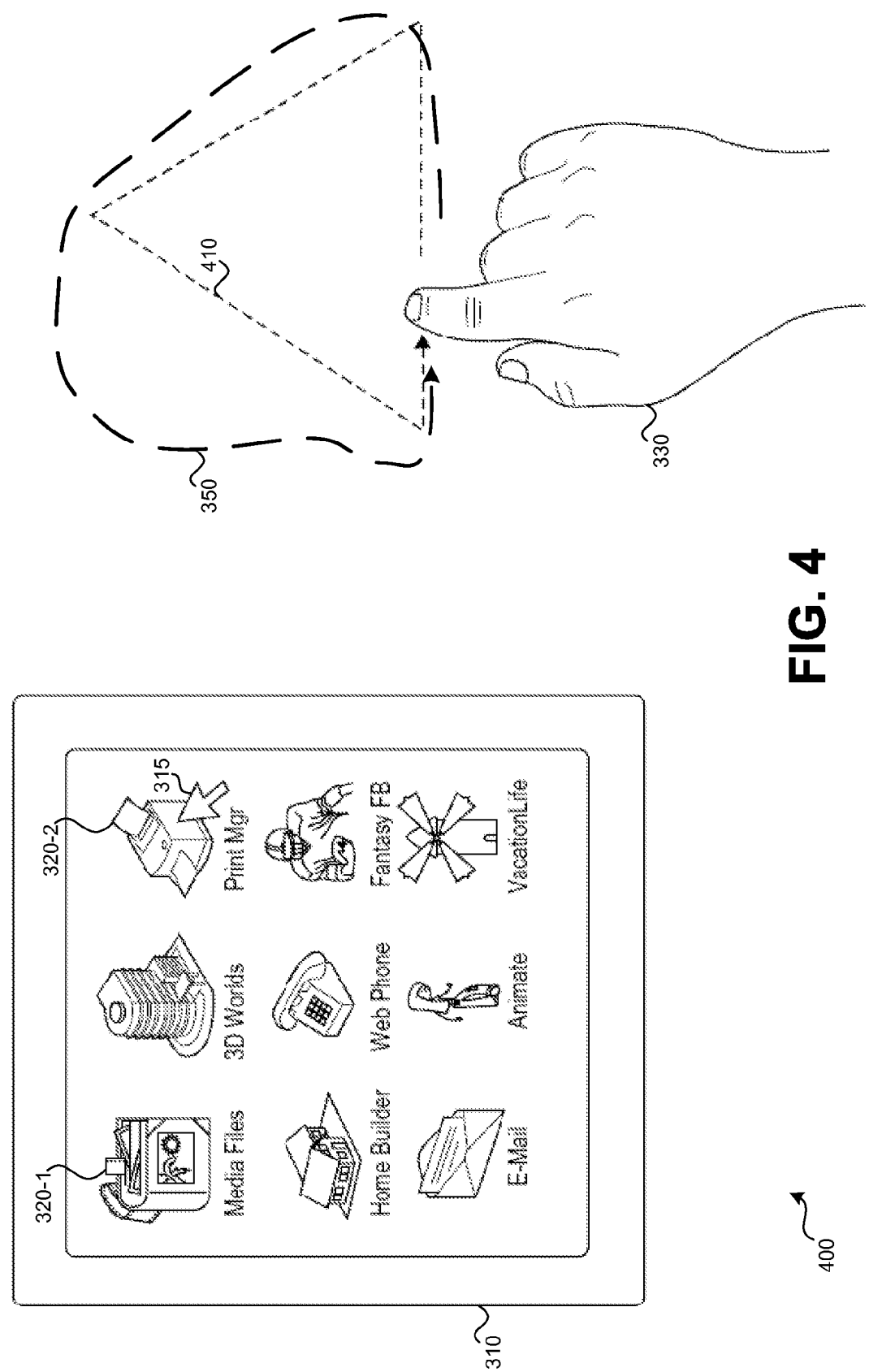
FIG. 4 illustrates another embodiment of a gesture being recognized using context-sensitive gesture classification.

FIG. 4 illustrates an embodiment 400 of a gesture being recognized using context-sensitive gesture classification. Like embodiment 300, embodiment 400 may involve use of systems 100A or 100B of FIGS. 1A and 1B, respectively. Embodiment 400 may represent embodiment 300 of FIG. 3 with a different application selected. The user may manipulate cursor 315 to position over an icon 320-2 of a different application. In embodiment 400, when the user manipulates cursor 315 in user interface 310 to be positioned over icons and/or text corresponding to a particular application, a gesture classification context associated with the particular application is made active. Therefore, in some embodiments, an operating system managing user interface 310 may determine which gesture classification context is active based on cursor 315.

In embodiment 400, cursor 315 has been positioned by the user over icon 320-2, which corresponds to a "print manager" application. While cursor 315 is positioned over icon 320-2 (or the text corresponding to icon 320-2) a previously-created gesture classification context that corresponds to the print manager application may be made active. While this gesture classification context is active, gestures performed by the user may be analyzed using the metrics associated with the active gesture classification context.

Referring back to FIG. 2, the gesture classification context made active by cursor 315 hovering over icon 320-2 may correspond to third gesture classification context 220-3. Therefore, while third gesture classification context 220-3 is active, metrics are active to differentiate: a circle gesture, a point gesture, a stop gesture, a swipe left gesture, a swipe right gesture, a snap gesture, a first gesture, a wiggle gesture, and a triangle gesture from each other (but not necessarily from other gestures, such as other gestures of set of available gestures 210). While third gesture classification context 220-3 is active, the user may use hand 330 of the user to perform a gesture.

Since cursor 315 is positioned over icon 320-2, it is assumed that any gesture that the user performs is intended as input to the "print manager" application. Only gestures of third gesture classification context 220-3 are valid for the print manager application; therefore, it can be expected that the user is performing one of the nine gestures of third gesture classification context 220-3. In FIG. 4, two movement paths 410 and 350 are illustrated. Hand 330 may perform a triangle gesture by moving along movement path 410. When this gesture performed by hand 330 is analyzed according to the metrics of third gesture classification context 220-3, it may be classified as a triangle gesture. A command indicating or otherwise corresponding to the triangle gesture may be provided as input to the print manager application over which cursor 315 is hovering.

While movement path 410 illustrates an ideal triangle gesture, a user moving hand 330 precisely along movement path 410 may be unlikely. Rather, a user attempting to perform a triangle gesture may move hand 330 along a movement path similar to movement path 350. Notably, this movement path was also performed by hand 330 in embodiment 300.

If a user moves hand 330 along movement path 350, this movement path 350 may be analyzed according to the metrics of third gesture classification context 220-3. Based on these metrics, movement path 350 may be determined to correspond to a triangle gesture, which is valid within third gesture classification context 220-3 and has metrics to differentiate a triangle gesture from other gestures performed while third gesture classification context 220-3 is active. Alternatively, based on these metrics, movement path 350 may be determined to correspond to a circle gesture, which is valid within third gesture classification context 220-3 and has metrics to differentiate a circle gesture from other gestures performed while third gesture classification context 220-3 is active.

In addition to determining which gesture is identified, a confidence level may be determined for a gesture. At least a threshold confidence level may need to be met for an indication of a gesture to be output to the user interface environment, or more specifically, an application with which the user is interacting. Referring to FIG. 3, movement path 340 may result in a very high confidence level that the gesture performed by hand 330 is a circle. Movement path 350 may result in a lower, yet still high confidence level that the gesture performed by hand 330 is a circle because the metrics used to identify the gesture corresponding to movement path 350 indicate there is no other similar gesture within the subset of gestures for second gesture classification context 220-2. Referring to FIG. 4, movement path 410 may result in a very high confidence level that the gesture performed by hand 330 is a triangle. Movement path 350 may result in a much lower confidence level that the gesture performed by hand 330 is a circle or triangle because the metrics used to identify the gesture corresponding to movement path 350 may have difficulty determining if movement path 350 corresponds to a circle or a triangle.

While it may be unclear how movement path 350 may be interpreted using the metrics of third gesture classification context 220-3, as an additional example, if first gesture classification context 220-1 is active, it has metrics to distinguish a triangle gesture, but not a circle gesture, from other gestures of a subset of gestures for the first gesture classification context 220-1. Movement path 350 may be identified as a triangle gesture with a relatively high confidence level because the metrics indicate that no other gesture is associated with first gesture classification context 220-1 that movement path 350 may represent.

In FIGS. 3 and 4, embodiments have been described in which a gesture context classification is made active based on which icon a cursor is hovering over. In other embodiments, a user may look at an icon (via eye-tracking on a head-mounted display). In other embodiments, a user may click on or otherwise activate or execute an application. Regardless of the application active, a same gesture analysis engine may be used to identify performed gestures, however, different gesture classification contexts may be made active and used by the gesture analysis engine.

Figure 5:
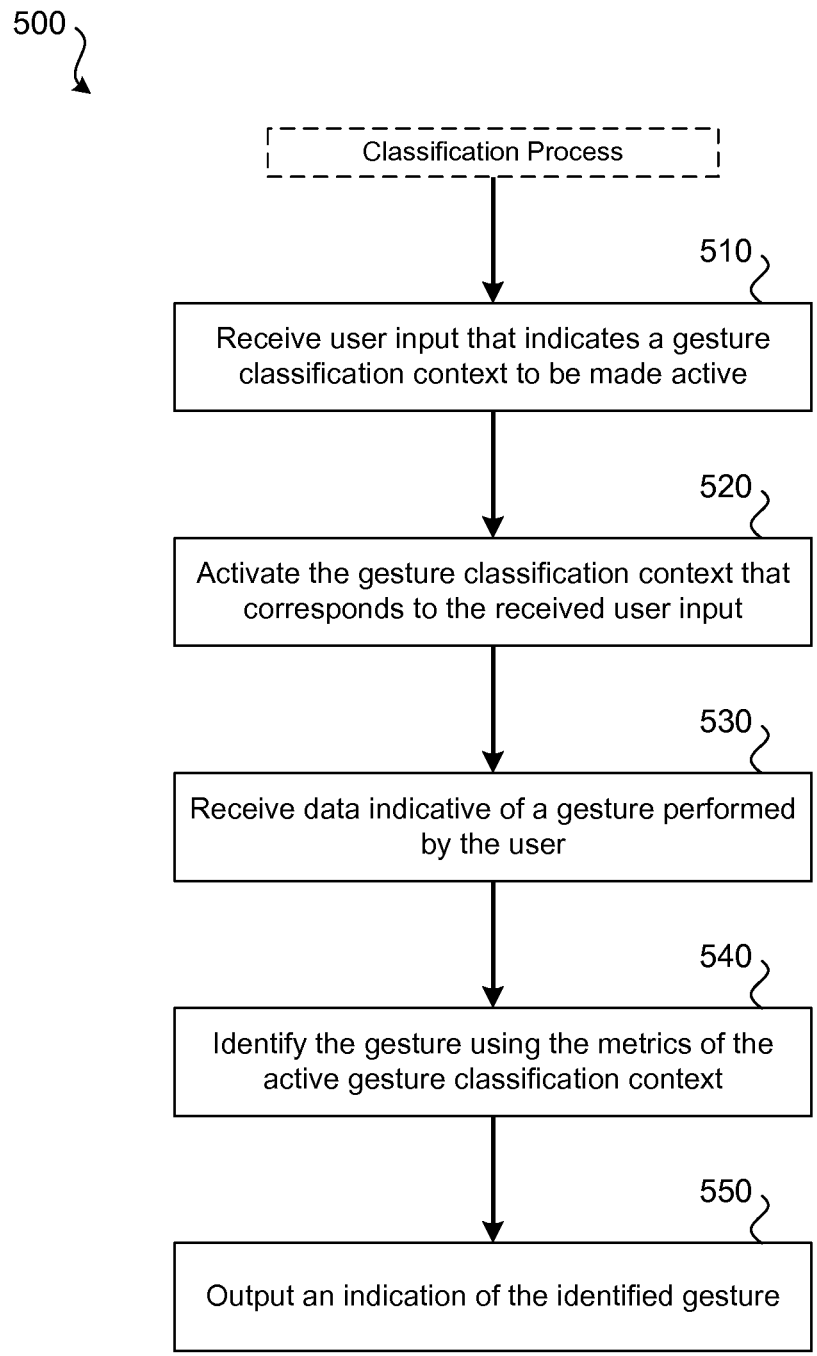
FIG. 5 illustrates an embodiment of a method for recognizing a gesture using context-sensitive gesture classification.

Various methods may be performed using the systems of FIGS. 1A and 1B in accordance with the described embodiments of FIGS. 2-4. FIG. 5 illustrates an embodiment of a method 500 for recognizing a gesture using context-based gesture identification. Method 500 may be performed using systems 100A, 100B, or some other system for recognizing a gesture using context-sensitive gesture classifications. Method 500 may be performed using computerized components. As such, one or more instances of one or more components of computer system 700 of FIG. 7 may be used in performing method 500. Further, one or more instances of one or more components of system 100A and system 100B may be used in performing method 500. Likewise, means for performing the steps of method 500 include one or more instances of components of systems 100A, 100B, and computer system 700, of FIGS. 1A, 1B, and 7, respectively. Method 500 may be performed after a classification process, such as method 600 of FIG. 6, has been performed. For instance, method 600 may be performed multiple times in order to create the gesture classification contexts used in method 500.

At step 510, user input may be received that causes a gesture classification context to be made active. Referring to FIGS. 1A and 1B, user input may be received via user input module 120, which may include components, such as a keyboard, a mouse, or a head-mounted display. The input received from the user may cause a user interface environment to enter a particular gesture classification context. For example, the user input may provide input that causes a cursor to hover over an indication of an application with which the user desires to interact. Such a user interface environment may be configured such that when a cursor hovers over a graphical representation of an application, a command based on a performed gesture or an indication of the performed gesture is provided to the application associated with the graphical representation. In other embodiments, rather than hovering a cursor, the user may click on, look at (e.g., via an HMD), or otherwise select an application or portion of an operating system with which the user desires to interact. Means for performing step 510 include user input module 120, a keyboard, a mouse, head-mounted display, other device configured to receive user input, one or more processors, and/or one or more components of the computer system of FIG. 7.

At step 520, a gesture classification context that corresponds to the received user input may be activated. The gesture classification context activated at step 520 may be based on the user input received at step 510. Referring to FIGS. 1A and 1B, user interface environment 130 may provide an indication of an application that has been activated by the user to gesture analysis engine 140 or an indication of the gesture classification context to be made active. In response to receiving such an indication, a gesture classification context corresponding to the activated application (or portion of the operating system) or the indicated gesture classification context may be loaded from gesture classification context database 145 or otherwise made active. In some embodiments, user interface environment 130 may load the appropriate gesture classification context from gesture classification context database 145. In some embodiments, while an indication of which gesture classification context that is to be made active is stored, the gesture classification context may not be loaded or otherwise made active until performance of a gesture by a user is sensed. In some embodiments, if the performance of a gesture is sensed, a gesture analysis engine may query a user interface environment to determine which gesture classification context should be made active for use in identifying the gesture. Means for performing step 520 include a user interface environment, operating system, one or more processors, one or more applications, a gesture classification context database, a gesture analysis engine, and/or one or more components of the computer system of FIG. 7.

At step 530, data indicative of the gesture performed by the user may be received. Such data may include one or more images captured of all or a portion of the user's body (e.g., one or more images of a hand and/or arm of the user). Other data that may be indicative of the gesture performed by the user may include data corresponding to electrical measurements of one or more of the user's muscles. Step 530 may be performed by gesture detection module 110 of systems 100A and 100B, which may capture and/or receive the data indicative of the gesture. Step 530 may include receiving such data from a capture device. For instance, the capture device may be a camera or electrical sensor, from which the data indicative of the gesture may be received. Means for performing step 530 may include one or more processors, a gesture detection module, one or more cameras, one or more electrical impulse sensors, and/or one or more components of the computer system of FIG. 7.

At step 540, the data received at step 530 that is indicative of the gesture performed by the user may be analyzed according to the metrics of the gesture classification context activated at step 520. Therefore, the metrics used to identify the gesture performed by the user may be at least partially based on the user input received at step 510 that indicated a gesture classification context to be applied. Analysis of the data indicative of the gesture may be performed using the metrics to identify a gesture performed by the user and, possibly, a confidence level that the identified gesture is accurate. In some embodiments, only gestures which are part of the subgroup of gestures used to create the active gesture classification context may be identified at step 540. Therefore, for example, referring to embodiment 200, if a first gesture classification context 220-1 is active, only a snap, stop, triangle, swipe left, or swipe right gesture may be identified at step 540. Use of the metrics at step 540 of the active gesture classification context may serve the purpose of distinguishing which gesture of the subset of gestures for the active gesture classification context is most likely the gesture performed by the user. Gestures which are not part of the active gesture classification context may not be considered when the metrics of the active gesture classification context are applied. Means for performing step 540 may include a gesture analysis engine, a gesture classification context database, and/or one or more components of the computer system of FIG. 7, such as one or more processors.

At step 550, an indication of the gesture that was identified to have been performed in accordance with the metrics of the active gesture classification context may be output. Referring to FIGS. 1A and 1B, gesture analysis engine 140 may output an indication of the gesture determined to have been performed to user interface environment 130. As such, the output from gesture analysis engine 140 may serve as an input to an application of applications 134. The application or portion of the operating system to which the indication of the gesture is provided may be based on the user input received at step 510. As an example, if the user input at step 510 indicated a context associated with a particular application, the indication of the gesture may be provided to this particular application. The gesture analysis engine that provides the output may be configured to provide an indication of a gesture to multiple applications and/or operating systems of a user interface environment. Means for performing step 550 may include a gesture analysis engine and/or one or more components of the computer system of FIG. 7, such as one or more processors.

Figure 6:
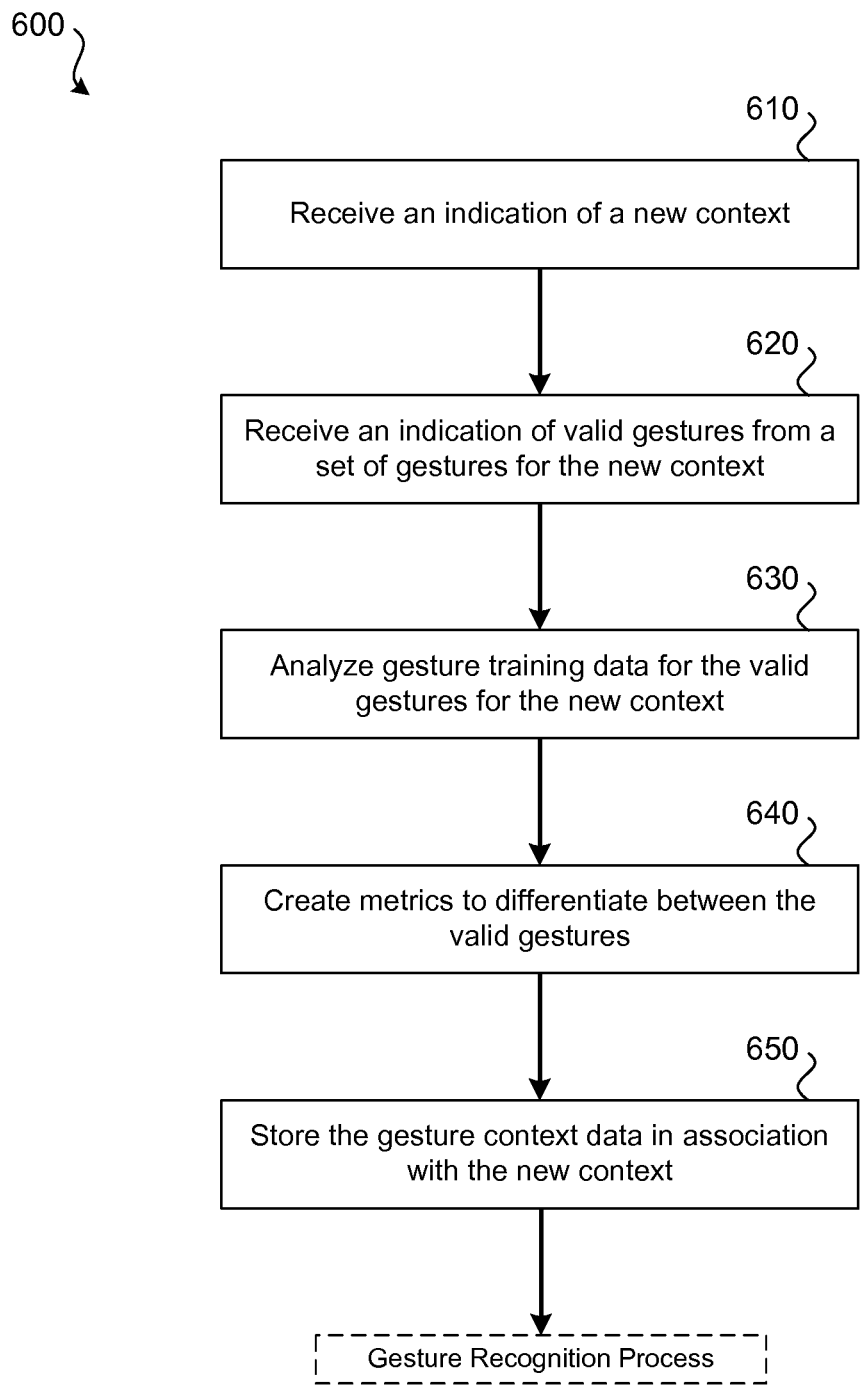
FIG. 6 illustrates an embodiment of a method for creating a context-sensitive gesture classification for use in recognizing a gesture.

FIG. 6 illustrates an embodiment of a method 600 for creating a context-sensitive gesture classification for use in recognizing a gesture. Method 600 may be performed using systems 100A, 100B, or some other system for creating context-sensitive gesture classifications. Method 600 may be performed using computerized components. As such, one or more instances of one or more components of computer system 700 of FIG. 7 may be used in performing embodiments of method 600. Further, one or more instances of one or more components of system 100A and system 100B may be used in performing method 600. Likewise, means for performing the steps of method 600 include one or more instances of components of systems 100A, 100B, and computer system 700, of FIGS. 1A, 1B, and 7, respectively. Method 600 may be performed before a gesture identification process, such as method 500 of FIG. 5, has been performed. For instance, method 600 may be performed multiple times in order to create the gesture classification contexts used in method 500.

The metrics for gesture classification contexts may be calculated before a request to make the gesture classification context active is received. For instance, a gesture classification context that will be specific to a particular application may be created upon the application being installed to a computer system of a user. In some embodiments, the metrics for the gesture classification context may be calculated at a remote server system and may be requested by a user's computer system. The remote server system may compute metrics for some or all possible subsets of gestures from a set of available gestures. As such, a gesture subset database may be created containing metrics for various subsets of gestures selected from a set of available gestures. Such a database may be maintained remotely from a computer system performing gesture recognition. Upon request, the metrics for a particular subset may be provided to the computer system.

At step 610, an indication of a new gesture classification context may be received. For instance, if a new application is being installed, the new gesture classification context may be linked to this application. As such, if a user places a user interface environment in the context of the new application, such as by hovering a cursor over an icon of the application, the gesture classification context of the new application will be made active. Means for performing step 610 may include a classification engine, a gesture classification context database, a user interface environment (e.g., operating system and/or one or more applications), and/or one or more components of the computer system of FIG. 7, such as one or more processors.

At step 620, an indication of which gestures are to be valid in the gesture classification context being created. This indication may be received from the application or part of the operating system with which the gesture classification context is being linked. The gestures identified may be selected from a set of available gestures. As such, the application may be restricted to selecting gestures from a set of available gestures, such as illustrated in FIG. 2. Therefore, the creator of an application may select some or all gestures from the available gestures to be made valid for the application's gesture classification context. The fewer gestures made valid, the more accurate gesture identification may be expected to be. Referring to FIGS. 1A and 1B, the indications of which gestures that are to be valid within the gesture classification context may be received by classification engine 150 from user interface environment 130. A check may be performed to determine if a gesture classification context has previously been created that corresponds to the gestures that are to be valid in the gesture classification context (for example, two applications may each only recognize a swipe left and swipe right gesture). If so, creation of metrics for the new gesture classification context may be skipped and the previously-created gesture classification context may be used. Means for performing step 620 may include a classification engine, a gesture classification context database, a user interface environment (e.g., operating system and/or one or more applications), and/or one or more components of the computer system of FIG. 7, such as one or more processors.

At step 630, gesture training data for each of the gestures to be valid within the gesture classification context being created may be analyzed. Gesture training data may be available for all gestures within a set of available gestures. Therefore, gesture training data may be selected for the specific gestures which will be valid in the gesture classification context being created. Referring to FIGS. 1A and 1B, classification engine 150 may have access to a gesture training database 160, which may be local or remotely located, and may contain training data. Gesture training data may be data on how a gesture is performed by one or more users. For instance, if electrical data from a user's muscles are to be used to determine if a particular gesture has been performed, gesture training data for that gesture may contain data for tens, hundreds, or thousands of persons. This data may indicate what the electrical characteristics of their muscles were for that particular gesture. Further, training data may contain data specific to a particular user. For example, samples of a user who will be using systems 100A or 100B may be collected. Therefore, for example, gesture training data may contain examples of how the user performs a snap gesture and a wave gesture. By comparing the training data for different gestures, metrics can be created to differentiate gestures that are to be valid within the gesture classification context from other gestures that are to be valid within the gesture classification context. Gestures that are not to be valid within the gesture classification context may be ignored and may not have corresponding metrics created. Means for performing step 630 may include a classification engine, a gesture classification context database, and/or one or more components of the computer system of FIG. 7, such as one or more processors.

At step 640, metrics may be calculated to differentiate each valid gesture from each other valid gesture. Therefore, metrics are created to identify gestures among the subset of valid gestures, but not among gestures that are not part of the subset of valid gestures. Creation of the metrics may be performed as previously detailed. Means for performing step 640 may include a classification engine, a gesture classification context database, and/or one or more components of the computer system of FIG. 7, such as one or more processors.

At step 650, the metrics of the gesture classification context may be stored. For example, the gesture classification context may be stored as part of a gesture classification context database. Whenever the context is made active, the metrics for the gesture classification context may be loaded and used for interpreting any gestures performed by a user. Therefore, whenever the gesture classification context is made active, the metrics for the gesture classification context will be available. Means for performing step 650 may include a classification engine, a gesture classification context database, and/or one or more components of the computer system of FIG. 7, such as one or more processors.

Figure 7:
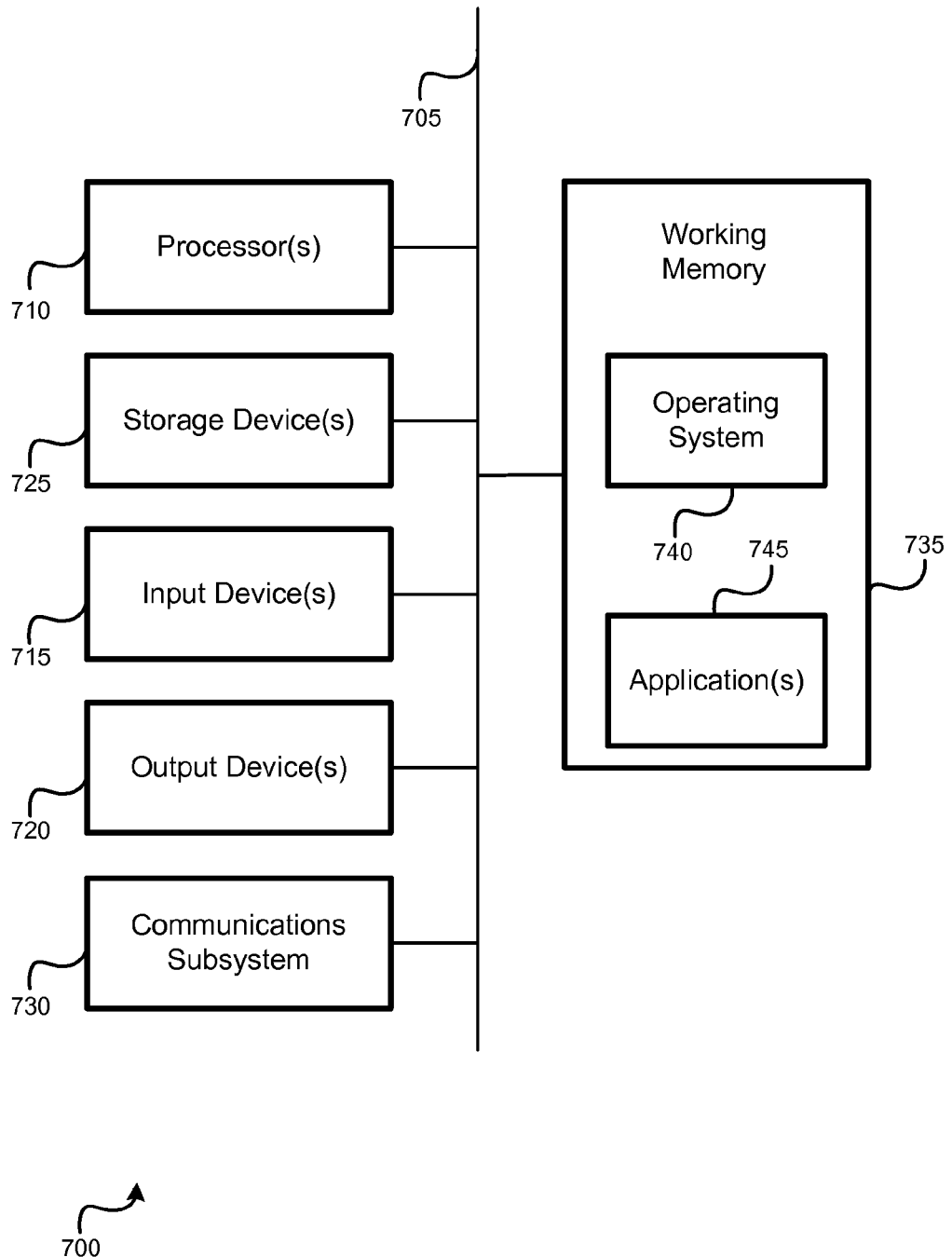
FIG. 7 illustrates an embodiment of a computer system.

FIG. 7 illustrates an embodiment of a computer system. A computer system as illustrated in FIG. 7 may be incorporated as part of the previously described computerized devices, such as the television receivers and content resources. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as digital signal processing chips, graphics acceleration processors, video decoders, and/or the like); one or more input devices 715, which can include, without limitation, a mouse, a keyboard, remote control, and/or the like; and one or more output devices 720, which can include, without limitation, a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. For instance, referring to FIGS. 1A and 1B, gesture classification context database 145 and gesture training database 160 may be stored using one or more non-transitory storage devices 725.

The computer system 700 might also include a communications subsystem 730, which can include, without limitation, a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 730 may permit data to be exchanged with a network (such as the network described below, to name one example), other computer systems, and/or any other devices described herein. Referring to FIG. 1B, communications subsystem 730 may permit communication via network 170. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein, such as applications 134 and operating system 132. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc., carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium, such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for recognizing a gesture, the method comprising:
   determining, by a computer system, a first set of metrics to differentiate gestures from among only a first subset of gestures of a plurality of gestures, the first subset of gestures recognizable as valid input in a particular context of a user interface environment of the computer system;
   receiving, by the computer system, user input that causes a gesture classification context to be applied from a plurality of gesture classification contexts available for a gesture analysis engine, wherein the gesture classification context indicates the first subset of gestures;
   applying, by the computer system, the gesture classification context to the gesture analysis engine;
   after applying the gesture classification context, receiving, by the computer system, data indicative of the gesture performed by a user;
   identifying, by the computer system, using the gesture analysis engine and based on the first set of metrics, the gesture in accordance with the applied gesture classification context, wherein identifying includes identifying the gesture from only the first subset of gestures of the plurality of gestures indicated by the applied gesture classification context while the gesture classification context is applied;
   determine a second subset of gestures from the plurality of gestures, wherein each gesture of the second subset of gestures is valid in a second gesture classification context;
   determining, by the computer system, a second set of metrics for the second subset of gestures to differentiate gestures from among only the second subset of gestures, wherein:
     only the second subset of gestures are eligible to be identified when the second gesture classification context is applied, and
     at least one gesture of the second subset of gestures is not in the first subset of gestures;
   receiving, by the computer system, user input that causes the second gesture classification context to be applied to the gesture analysis engine;

after applying the second gesture classification context, receiving, by the computer system, data indicative of a second gesture performed by the user; and identifying, by the computer system, based on the second set of metrics, the second gesture in accordance with the applied second gesture classification context, wherein identifying includes identifying the second gesture from only the second subset of gestures indicated by the applied second gesture classification context.

2. The method for recognizing the gesture of claim 1, wherein receiving the user input that causes the gesture classification context to be applied comprises:

receiving, by the computer system, user input that selects an application within a user interface.

3. The method for recognizing the gesture of claim 2, wherein receiving the user input that causes the gesture classification context to be applied further comprises:

receiving, by the computer system, user input that causes a cursor to hover over an icon presented by the user interface.

4. The method for recognizing the gesture of claim 1, wherein determining the first set of metrics to differentiate gestures from among only the first subset of gestures comprises:

determining, by the computer system, metrics for each gesture of the first subset of gestures, wherein the metrics for each gesture of the first subset of gestures is at least partially based on gesture training data and other gestures of the first subset of gestures.

5. The method for recognizing the gesture of claim 1, wherein:

determining the second subset of gestures from the plurality of gestures and determining the second set of metrics for the second subset of gestures to differentiate gestures from among only the second subset of gestures occur in response to an application being installed on the computer system.

6. The method for recognizing the gesture of claim 1, wherein:

determining the second subset of gestures from the plurality of gestures and determining the second set of metrics for the second subset of gestures to differentiate gestures from among only the second subset of gestures occur during creation of a gesture subset database, wherein the gesture subset database comprises gesture classification contexts for multiple subsets of the plurality of gestures.

7. A system for recognizing a gesture, the system comprising:

one or more processors configured to:

determine a first set of metrics to differentiate gestures from among only a first subset of gestures of a plurality of gestures, the first subset of gestures recognizable as valid input in a particular context of a user interface environment of the system;

receive user input that causes a gesture classification context to be applied from a plurality of gesture classification contexts available for a gesture analysis engine, wherein the gesture classification context indicates the first subset of gestures;

apply the gesture classification context to the gesture analysis engine;

after applying the gesture classification context, receive data indicative of the gesture performed by a user; and identify, based on the first set of metrics, using the gesture analysis engine, the gesture in accordance with the applied gesture classification context, wherein identifying includes identifying the gesture from only the first subset of gestures of the plurality of gestures indicated by the applied gesture classification context while the gesture classification context is applied;

determine a second subset of gestures from the plurality of gestures, wherein each gesture of the second subset of gestures is valid in a second gesture classification context;

calculate a second set of metrics for the second subset of gestures to differentiate gestures from among only the second subset of gestures, wherein:

only the second subset of gestures are eligible to be identified when the second gesture classification context is applied, and at least one gesture of the second subset of gestures is not in the first subset of gestures;

receive user input that causes the second gesture classification context to be applied to the gesture analysis engine;

after applying the second gesture classification context, receive data indicative of a second gesture performed by the user; and identify, based on the second set of metrics, the second gesture in accordance with the applied second gesture classification context, wherein identifying includes identifying the second gesture from only the second subset of gestures indicated by the applied second gesture classification context.

8. The system for recognizing the gesture of claim 7, wherein receiving the user input that causes the gesture classification context to be applied comprises:

receive user input that selects an application within a user interface.

9. The system for recognizing the gesture of claim 8, wherein receiving the user input that causes the gesture classification context to be applied comprises:

receiving user input that causes a cursor to hover over an icon presented by the user interface.

10. The system for recognizing the gesture of claim 7, wherein calculating the first set of metrics to differentiate gestures from among only the first subset of gestures comprises:

calculating metrics for each gesture of the first subset of gestures, wherein the metrics for each gesture of the first subset of gestures is at least partially based on gesture training data and other gestures of the first subset of gestures.

11. The system for recognizing the gesture of claim 7, wherein:

determining the second subset of gestures from the plurality of gestures and determining the second set of metrics for the second subset of gestures to differentiate gestures from among only the second subset of gestures occur in response to an application being installed on the system.

12. The system for recognizing the gesture of claim 7, wherein:

determining the second subset of gestures from the plurality of gestures and determining the second set of metrics for the second subset of gestures to differentiate gestures from among only the second subset of gestures occur during creation of a gesture subset database, wherein the gesture subset database comprises gesture classification contexts for multiple subsets of the plurality of gestures.

13. A non-transitory processor-readable medium, comprising instructions, when executed by one or more processors, cause the one or more processors to:
   determine a first set of metrics to differentiate gestures from among only a first subset of gestures of a plurality of gestures, the first subset of gestures recognizable as valid input in a particular context of a user interface environment;
   receive user input that causes a gesture classification context to be applied from a plurality of gesture classification contexts available for a gesture analysis engine, wherein the gesture classification context indicates the first subset of gestures;
   apply the gesture classification context to the gesture analysis engine;
   after applying the gesture classification context, receive data indicative of the gesture performed by a user; and
   identify, based on the first subset of gestures, using the gesture analysis engine, the gesture in accordance with the applied gesture classification context, wherein identifying includes identifying the gesture from only the first subset of gestures of the plurality of gestures indicated by the applied gesture classification context while the gesture classification context is applied;
   determine a second subset of gestures from the plurality of gestures, wherein each gesture of the second subset of gestures is valid in a second gesture classification context;
   calculate a second set of metrics for the second subset of gestures to differentiate gestures from among only the second subset of gestures, wherein:
      only the second subset of gestures are eligible to be identified when the second gesture classification context is applied, and
      at least one gesture of the second subset of gestures is not in the first subset of gestures;
   receive user input that causes the second gesture classification context to be applied to the gesture analysis engine;
   after applying the second gesture classification context, receive data indicative of a second gesture performed by the user; and
   identify, based on the second set of metrics, the second gesture in accordance with the applied second gesture classification context, wherein identifying includes identifying the second gesture from only the second subset of gestures indicated by the applied second gesture classification context.

14. The non-transitory processor-readable medium of claim 13, wherein:
   receiving user input that selects an application within a user interface.

15. The non-transitory processor-readable of claim 14, wherein receiving the user input that causes the gesture classification context to be applied further comprises:
   receiving user input that causes a cursor to hover over an icon presented by the user interface.

16. The non-transitory processor-readable medium for recognizing the gesture of claim 13, wherein determining the first set of metrics to differentiate gestures from among only the first subset of gestures comprises:
   determining metrics for each gesture of the first subset of gestures, wherein the metrics for each gesture of the first subset of gestures is at least partially based on gesture training data and other gestures of the first subset of gestures.

17. The non-transitory processor-readable medium for recognizing the gesture of claim 13, wherein:
   determining the second subset of gestures from the plurality of gestures and determining the second set of metrics for the second subset of gestures to differentiate gestures from among only the second subset of gestures occur in response to an application being installed on the computer system.

18. The non-transitory processor-readable medium for recognizing the gesture of claim 13, wherein:
   determining the second subset of gestures from the plurality of gestures and determining the second set of metrics for the second subset of gestures to differentiate gestures from among only the second subset of gestures occur during creation of a gesture subset database, wherein the gesture subset database comprises gesture classification contexts for multiple subsets of the plurality of gestures.

19. A apparatus for recognizing a gesture, the apparatus comprising:
   means for determining a first set of metrics to differentiate gestures from among only a first subset of gestures of a plurality of gestures, the first subset of gestures recognizable as valid input in a particular context of a user interface environment;
   means for receiving user input that causes a gesture classification context to be applied from a plurality of gesture classification contexts that are available for a means for gesture analysis, wherein the gesture classification context indicates the first subset of gestures;
   means for applying the gesture classification context to the means for gesture analysis;
   means for receiving data indicative of the gesture performed by a user after applying the gesture classification context; and
   means for, based on the first set of metrics, identifying using the means for gesture analysis, the gesture in accordance with the applied gesture classification context, wherein identifying includes identifying the gesture from only the first subset of gestures of the plurality of gestures indicated by the applied gesture classification context while the gesture classification context is applied;
   means for receiving an indication of a second subset of gestures from the plurality of gestures, wherein each gesture of the second subset of gestures is valid in a second gesture classification context;
   means for calculating a second set of metrics for the second subset of gestures to differentiate gestures from among only the second subset of gestures, wherein:
      only the second subset of gestures are eligible to be identified when the second gesture classification context is applied, and
      at least one gesture of the second subset of gestures is not in the first subset of gestures;
   means for receiving user input that causes the second gesture classification context to be applied to the means for gesture analysis;
   means for receiving data indicative of a second gesture performed by the user after applying the second gesture classification context; and
   means for identifying, based on the second set of metrics, the second gesture in accordance with the applied second gesture classification context, wherein identifying includes identifying the second gesture from only the second subset of gestures indicated by the applied second gesture classification context.

20. The apparatus for recognizing the gesture of claim 19, wherein the means for receiving the user input that causes the gesture classification context to be applied comprises:

means for receiving user input that selects an application within a user interface.

21. The apparatus for recognizing the gesture of claim 20, wherein the means for receiving the user input that causes the gesture classification context to be applied further comprises:

means for receiving user input that causes a cursor to hover over an icon presented by the user interface.

22. The apparatus for recognizing the gesture of claim 19, wherein the means for determining the first set of metrics to differentiate gestures from among only the first subset of gestures comprises:

means for determining metrics for each gesture of the first subset of gestures, wherein the metrics for each gesture of the first subset of gestures is at least partially based on gesture training data and other gestures of the first subset of gestures.

23. The apparatus for recognizing the gesture of claim 19, wherein:

the determining the second subset of gestures from the plurality of gestures and the determining calculating the second set of metrics for the second subset of gestures to differentiate gestures from among only the second subset of gestures occur in response to an application being installed on the computer system.

24. The apparatus for recognizing the gesture of claim 19, wherein:

the determining the second subset of gestures from the plurality of gestures and the determining the second set of metrics for the second subset of gestures to differentiate gestures from among only the second subset of gestures occur during creation of a gesture subset database, wherein the gesture subset database comprises gesture classification contexts for multiple subsets of the plurality of gestures.

\* \* \* \* \*